US005731134A

United States Patent [19]

Honan et al.

[11] Patent Number: 5,731,134

[45] Date of Patent: Mar. 24, 1998

[54] GELATIN AND POLYMER LATEX DISPERSION COATING COMPOSITIONS

[75] Inventors: James Stephen Honan, Spencerport; John Bruce Walters, Henrietta; Thomas Haile Whitesides, Rochester, all of N.Y.

[73] Assignee: Eastman Kodak Company, Rochester, N.Y.

[21] Appl. No.: 605,237

[22] Filed: Feb. 9, 1996

[51] Int. Cl.[6] .......... C03C 1/053; C03C 1/015; C03C 7/388; C08K 1/00

[52] U.S. Cl. .......... 430/449; 430/493; 430/512; 430/517; 430/545; 430/566; 430/628; 430/642; 106/135; 106/136; 523/201; 523/207; 523/210; 523/211; 523/315; 523/319

[58] Field of Search .......... 430/545, 628, 430/642, 449, 493, 512, 517, 566; 106/135, 136; 523/315, 319, 211, 210, 207, 201

[56] References Cited

U.S. PATENT DOCUMENTS

| | | | |
|---|---|---|---|
| 3,551,151 | 12/1970 | Malan | 430/642 |
| 4,146,398 | 3/1979 | Arase et al. | 430/359 |
| 4,203,716 | 5/1980 | Chen | 430/207 |
| 4,220,703 | 9/1980 | Katoh | 430/213 |
| 4,304,769 | 12/1981 | Chen | 424/218 |
| 4,368,258 | 1/1983 | Fujiwhara et al. | 430/493 |
| 4,830,948 | 5/1989 | Ishikawa et al. | 430/372 |
| 4,942,121 | 7/1990 | Kajiwara et al. | 430/583 |
| 5,055,386 | 10/1991 | Hirano et al. | 430/545 |
| 5,187,259 | 2/1993 | Sterman et al. | 430/354 |
| 5,206,120 | 4/1993 | Hayashi | 430/376 |
| 5,318,889 | 6/1994 | Bagchi et al. | 430/642 |
| 5,378,598 | 1/1995 | Bagchi et al. | 430/569 |
| 5,558,980 | 9/1996 | Nielsen et al. | 430/545 |
| 5,594,047 | 1/1997 | Nielson et al. | 430/517 |

FOREIGN PATENT DOCUMENTS

| | | |
|---|---|---|
| 578169 | 1/1994 | European Pat. Off. . |
| 586974 | 3/1994 | European Pat. Off. . |
| 593180 | 4/1994 | European Pat. Off. . |
| 1334397 | 10/1973 | United Kingdom . |

OTHER PUBLICATIONS

P.C. Hiemenz, "Principles of Colloid And Surface Chemistry", 2nd Edition, Marcel Dekker, Inc., 1986, Ch. 11, pp. 611–676.

*Primary Examiner*—Richard L. Schilling
*Attorney, Agent, or Firm*—Andrew J. Anderson

[57] ABSTRACT

Stable photographic coating compositions comprising a polymer latex are prepared by mixing an aqueous solution comprising gelatin with a latex dispersion of a polymer of the formula $$(A)_x(B)_y(C)_z$$

where

A and B are formed from nonionic monomers,

C is formed from anionic monomers, and x, y and z are monomer weight fractions where x=0 to 1.0, y=0 to 1.0, x+y=about 0.98 to 1.0, and z=0 to about 0.02, wherein A, B, x and y are such that latex dispersions of polymers of the formula $(A)_x(B)_y$ have calcium ion critical coagulation concentrations of less than 80 mM $Ca^{+2}$ in gelatin solutions, wherein the gelatin of the aqueous solution mixed with the latex dispersion comprises a gelatin of low calcium ion content such that the coating composition has a calcium $Ca^{2+}$ concentration of less than 2 mM. The method of the invention allows for the preparation of aqueous gelatin coating solutions comprising latex dispersions of polymers which are unstable in the presence of calcium ions. The process can yield dispersions and photographic elements with superior attributes, including dispersion stability, and photographic color reproduction, image preservability, and abrasion resistance.

21 Claims, No Drawings

GELATIN AND POLYMER LATEX DISPERSION COATING COMPOSITIONS

FIELD OF THE INVENTION

The present invention relates to aqueous coating compositions comprising gelatin and polymer latex dispersions. More particularly, it relates to the use of gelatin having a low calcium ion concentration in combination with latex polymers which are destabilized when mixed with high calcium ion concentration gelatins.

BACKGROUND OF THE INVENTION

The use of polymers in photographic layer coating compositions is well know in the art. For example, polymers are frequently included in dispersions of photographic couplers and other photographically useful compounds which are part of coating compositions, or separately added to such coating compositions. Photographic elements containing such polymer-containing compositions may exhibit many advantages, including improved image preservability, improved physical properties, improved incubation storage before processing, and improved yellow leuco dye conversion.

Polymer-containing dispersions may be prepared by combining a polymer, photographically useful compound, and optional non-volatile solvent or other hydrophobic components with a volatile or substantially water-soluble auxiliary solvent to form an organic solution, which solution is then emulsified in an aqueous medium, often containing gelatin and a surfactant, the auxiliary solvent subsequently being removed by evaporation or by washing the gelled dispersion with water. The use of auxiliary solvent is important to the process of preparing polymer-containing dispersions. The solvent allows the polymer and any other hydrophobic components to be combined in a mixed solution, so that a dispersion with an oil phase of uniform composition is obtained. The solvent also lowers the viscosity of the oil solution, which allows the preparation of small-particle emulsified dispersions.

The use of auxiliary solvent, however, presents several difficulties in the preparation of photographic dispersions and elements. First, the auxiliary solvent does not allow for the introduction of many types of polymers. Polymers of high molecular weight cannot be easily introduced, because the high oil-phase viscosity does not allow for the formation of small-particle dispersions, as discussed in U.S. Pat. No. 5,055,386 and EP 586,974. Crosslinked polymers cannot be introduced in this manner. Large amounts of auxiliary solvent and high mixing energy are often necessary to prepare small-particle dispersions with polymers of even modest molecular weight. A second difficulty with auxiliary solvent is that it can cause severe coating defects if it is not removed before the coating operation. Third, the steps of evaporating volatile solvent from an evaporated dispersion and washing a chill-set, washed dispersion leads to final photographic dispersions with variable concentration, so that careful analysis is necessary to determine the actual concentration of the photographically useful compound in the dispersion. Fourth, the volatile or water-soluble auxiliary solvents present health, safety, and environmental hazards, with risks of exposure, fire, and contamination of air and water. Fifth, the cost can be significant for the solvent itself, as can be the costs of environmental and safety controls, solvent recovery, and solvent disposal.

Direct dispersion forming processes avoid the use of auxiliary solvents. In one such process, the hydrophobic components desired in the dispersion, typically coupler and coupler solvent, are simply melted at a temperature sufficient to obtain a homogeneous oil solution. This is then emulsified or dispersed in an aqueous phase, often containing gelatin and surfactant. With appropriate emulsification conditions, small-particle dispersions of much less than 1 micron diameter are obtained by this process. The direct process also yields a dispersion with a known concentration of the photographically useful compound, based on the components added, with no variability due to evaporation or washing steps. No volatile or water-soluble organic solvents are needed, eliminating the hazards and costs associated with their use. The direct dispersion process, however, cannot be generally applied to the preparation of polymer-containing dispersions. Homogeneous molten oil solutions of most couplers and coupler solvents dissolve only limited amounts or types of polymers, even with low molecular weight. Further, soluble polymers increase the viscosity of the oil phase dramatically, so that small-particle dispersions cannot usually be prepared.

In an effort to incorporate polymers into a photographic layer without having to dissolve such polymers in an auxiliary solvent, and to enable incorporation of polymers which could not be effectively directly dispersed in a permanent solvent, hydrophobic polymers have been added to photographic coating compositions as pre-dispersed latexes. Usually these latex polymers are prepared by emulsion polymerization, although emulsified dispersions of organic-soluble polymers are also described. Loaded latex dispersions, e.g., in which a hydrophobic photographically useful compound such as a coupler is "loaded" into the latex polymer particles, are described in, e.g., U.S. Pat. Nos. 4,203,716, 4,304,769 and 4,368,258. The usual procedure for preparing a loaded latex is to combine a solution of the hydrophobic photographically useful compound in a water-miscible organic solvent with the aqueous latex. The resulting mixture, which typically has about a 1:1 ratio of water to organic solvent, is diluted with water or the organic solvent is removed by evaporation, with the result that the hydrophobic compound becomes associated with or dissolved in the latex particles. Variations on this procedure vary the order of addition of the organic solution and aqueous latex, substitute water-immiscible volatile auxiliary solvents for the water-miscible auxiliary solvents, incorporate the water-miscible organic solvent in the emulsion polymerization step, or require the formation of intermediate water-in-oil emulsions of the latex in volatile organic solvent before the formation of the final oil-in-water loaded latex dispersion. In some cases, photographically useful compounds are dissolved in the organic monomers prior to emulsion polymerization. Procedures are also described in which base-ionizable couplers and/or base-ionizable latex polymers are combined at high pH, often with auxiliary solvent present, followed by neutralization and/or addition of magnesium salts or alkaline-earth metal salts, to form a dispersion of coupler and polymer.

Copending, commonly assigned U.S. Ser. No. 08/390,400, filed Feb. 17, 1995, the disclosure of which is incorporated by reference herein, discloses a method for preparing photographic dispersions in which hydrophobic photographically useful compounds such as couplers are loaded in a latex polymer by a procedure requiring essentially no volatile or water-miscible solvent, which procedure comprises preparing an oil phase solution of the hydrophobic compound or compounds which is most preferably essentially free of water-miscible or volatile solvent, combining the oil solution with one or more aqueous solutions, at least one of which contains a polymer latex, and mixing the combination of oil solution, aqueous solution and latex under high shear or turbulence. In preferred embodiments, the photographically useful compound or compounds and optional high-boiling solvents are combined at a temperature sufficient to prepare a liquid solution of the oil components, and this oil solution is then combined with an aqueous solution containing gelatin and surfactant. A polymer latex is either included in the aqueous solution before the oil phase is added, or is added after the oil and aqueous solutions have been combined. The mixture is then mixed under conditions of high shear or turbulence sufficient to cause loading of the photographically useful compound into the dispersed polymer latex.

Combinations of hydrophobic polymers with photographic coupler dispersions as described above can impart desirable image stability properties to dyes formed from the couplers. A preferred method for combining latex polymers with a coupler dispersion is to add the latex to an aqueous gelatin solution followed by the addition of a dispersion of the coupler and coupler solvent to the gelatin solution. In addition to providing image stability, various other uses of polymer dispersions in aqueous photographic coating solutions to achieve specific results for various layers of photographic elements are also known in the art, such as to increase viscosity, to reduce curl, to decrease pressure sensitivity, to increase dimensional stability, to prevent color stain, to improve dryability and scratch resistance, to deliver photographically useful materials, to prevent wandering of filter dyes, and as stress-absorbing layers as noted, e.g., in *Research Disclosure*, September 1994, Item 36544, Section II, published by Kenneth Mason Publications, Ltd., Dudley House, 12 North Street, Emsworth, Hampshire P010 7DQ, ENGLAND, and the patents cited therein.

Polymer latex dispersions are conventionally prepared by emulsion polymerization in an aqueous solution in the presence of anionic surfactants. The presence of the anionic surfactant serves to stabilize the formed polymer particles electrostatically. Colloidal particles which are solely electrostatically stabilized, however, are known to be destabilized by the presence of ions in solution, due to the charge-shielding effect of the ions. Steric stabilizers are typically employed to provide colloidal stability when charge stabilization is not effective (e.g., at high ionic strength or in non-aqueous solvents). Steric stabilizers are commonly polymeric materials that adsorb to the colloidal particles, and provide an entropic barrier to the close approach of such particles.

In the manufacture of photographic products, gelatin is widely used as a binder and, in solution, as a medium for the preparation of coating melts. In general, gelatin binds to both charged surfaces and to hydrophobic ones. While conventional lime-processed photographic gelatin typically contains a significant calcium ion concentration (e.g., about 3000 ppm), polymer latex dispersions typically are not destabilized when combined with such conventional gelatin in aqueous coating compositions as gelatin binds strongly to most small, hydrophobic latex particles, such as poly(styrene) latex, poly(butylacrylate) latex, poly(methylacrylate) latex, and the like, to sterically stabilize such particles. In the presence of gelatin, therefore, the stability of hydrophobic latex particles toward coagulation by salt is generally greatly enhanced relative to that in water solution without gelatin or other stabilizing agent.

PROBLEMS TO BE SOLVED

It has been found that some polymer latexes are unexpectedly destabilized when added to coating compositions comprising gelatin, which results in manufacturing difficulties for making such coating compositions. The process for coating such compositions in a multilayer photographic element may also be hindered, resulting in rapid plugging of process filters and coatings of poor quality due to particle defects. It would accordingly be desirable to provide a process for forming photographic coating compositions comprising gelatin and such unstable latexes.

SUMMARY OF THE INVENTION

It is the object of this invention to provide a method for making stable photographic coating compositions comprising a polymer latex, and for the satisfactory preparation therefrom of defect-free coatings useful in a photographic element.

In accordance with one embodiment of the invention, a process is disclosed for forming a photographic coating composition comprising mixing an aqueous solution comprising gelatin with a latex dispersion of a polymer of the formula $$(A)_x(B)_y(C)_z$$

where

A and B are formed from nonionic monomers,

C is formed from anionic monomers, and x, y and z are monomer weight fractions where x=0 to 1.0, y=0 to 1.0, x+y=about 0.98 to 1.0, and z=0 to about 0.02, wherein A, B, x and y are such that latex dispersions of polymers of the formula $(A)_x(B)_y$ have calcium ion critical coagulation concentrations of less than 80 mM $Ca^{+2}$ in gelatin solutions, wherein the gelatin of the aqueous solution mixed with the latex dispersion comprises a gelatin of low calcium ion content such that the coating composition has a calcium $Ca^{2+}$ concentration of less than 2 mM.

In accordance with a further embodiment of the invention, photographic coating compositions formed in accordance with the above process are disclosed.

ADVANTAGEOUS EFFECT OF THE INVENTION

The method of the invention allows for the preparation of aqueous gelatin coating solutions comprising latex dispersions of polymers which are unstable in the presence of calcium ions. The process can yield dispersions and photographic elements with superior attributes, including dispersion stability, and photographic color reproduction, image preservability, and abrasion resistance.

DETAILED DESCRIPTION OF THE INVENTION

Applicants have surprisingly found that certain hydrophobic polymer latexes may be flocculated in upon mixing in a photographic aqueous gelatin coating solution in the presence of salts, particularly calcium, such as are present in normal photographic gelatin, despite the steric stabilization usually provided by the presence of gelatin. As pointed out above, most latexes, particularly those prepared primarily from simple hydrophobic monomers and those formed using anionic surfactants during polymerization, are stable in gelatin solution, in spite of the presence of ions, because gelatin adsorbs strongly to the latex polymer particle surfaces and provides steric stabilization. While not wishing to be bound to any particular theory. Applicants believe that polymer latex instability results where the surface of a polymer particle formed from primarily non-ionic monomers is relatively too hydrophilic for gelatin to bind efficiently. Accordingly, the polymer may not adsorb gelatin strongly, and therefore would not be stabilized sterically as are most strongly hydrophobic non-ionic polymer latex materials upon mixing with gelatin. It was surprising to find, e.g., that poly t-butylacrylamide polymer latexes are unstable upon mixing with relatively high calcium ion containing gelatin solutions. While the t-butylacrylamide monomer is substantially hydrophobic in character, minor modification (e.g., removal of a methyl group from the pendant sidechain) leads to a non-ionic polymer that is water soluble (i.e., hydrophilic) under the appropriate conditions.

One measure of the colloidal stability of a small particle is the critical coagulation concentration (CCC). The CCC is the concentration of salt necessary to cause coagulation and separation of a colloidal suspension under quiescent conditions, and can be easily detected by turbidimetric measurements. In general, only charge stabilized colloids are very salt sensitive (have low CCCs) under quiescent conditions, while sterically stabilized colloids are relatively insensitive to salt (have very high CCCs).

The addition of an anionic comonomer to unstable polymers has been found to improve the stability of such latex polymers to ions in the presence of gelatin in a quiescent state (i.e., raise the polymer's CCC). While such quiescent state improvement is demonstrated even at relatively low concentrations of anionic monomer (e.g., about 2% or less) which would not significantly detrimentally affect the polymer's performance, such low levels have been found to provide insufficient stability upon dynamic mixing of a gelatin containing solution and the polymer latex in the presence of ions at concentrations found in conventional photographic grade gelatin such as calcium ions. For example, addition of low levels of the anionic comonomer 2-acrylamido-2-methylpropane sulfonate to a poly t-butylacrylamide polymer latex will improve its quiescent stability toward destabilization by ions, while under practical dispersion making dynamic mixing conditions with conventional gelatin such latexes are still destabilized.

Addition of a substantial level of an anionic comonomer (e.g., 10% anionic monomer) to unstable latexes may substantially improve the stability of such polymers towards destabilization upon dynamic mixing with a gelatin solution. The presence of such high levels of anionic monomer, however, can detrimentally affect the polymer's performance in a photographic element. Accordingly, in accordance with the invention, it has been found that it is necessary to use gelatin solutions of low ionic strength, preferably by using acid processed gelatin which is made by a process that maintains low ionic content in the gelatin, or by using deionized lime-processed gelatin, to provide a process wherein the calcium ion concentration is controlled upon dynamic mixing of a latex polymer dispersion with an aqueous gelatin solution to prevent destabilization of the latex.

The aqueous phase of the coating compositions prepared in accordance with the invention comprises gelatin. This may be a conventional gelatin or a modified gelatin such as acetylated gelatin, phthalated gelatin, oxidized gelatin, etc. Gelatin may be base-processed, such as lime-processed gelatin, or may be acid-processed, such as acid processed ossein gelatin. In accordance with the invention, coating compositions comprising gelatin are prepared wherein the calcium concentration of the composition is less than about 2 mM, preferably less than 1 mM. Conventional lime-processed ossein gelatin contains a substantial level of calcium salts derived from the gelatin starting materials and manufacturing process. In order to achieve the calcium concentration in the coating compositions required by the invention, it is preferred to use a deionized lime-processed gelatin or an acid-processed gelatin contaminated with a minimal amount of calcium during preparation thereof. Deionized gelatins may be obtained, e.g., using conventional treatment with ion exchange resins. In particularly preferred embodiments of the invention, deionized lime-processed ossein (DI LPO) or acid-processed ossein (APO) gelatin is used to achieve the required low calcium concentration.

In addition to gelatin, other water-soluble polymers or copolymers may be included in the coating compositions of the invention, such as poly(vinyl alcohol), partially hydrolyzed poly(vinylacetate/vinylalcohol), hydroxyethyl cellulose, poly(acrylic acid), poly(1-vinylpyrrolidone), poly (sodium styrene sulfonate), poly(2-acrylamido-2-methane sulfonic acid), polyacrylamide, etc. Copolymers of these polymers with hydrophobic monomers may also be used.

Preferred latex polymers of the invention include addition polymers prepared by emulsion polymerization. Especially preferred are polymers prepared as latexes with essentially no water-miscible or volatile solvent added to the monomer. Also suitable are dispersed addition or condensation polymers, prepared by emulsification of a polymer solution, or self-dispersing polymers. Especially preferred latex polymers include those prepared by free-radical polymerization of vinyl monomers in aqueous emulsion. Polymers comprising monomers which form water-insoluble homopolymers are preferred, as are copolymers of such monomers, which may also comprise monomers which give water-soluble homopolymers, if the overall polymer composition is sufficiently water-insoluble to form a latex.

In specific embodiments of the invention, A in the formula $(A)_x(B)_y(C)_z$ preferably comprises an N-alkylacrylamide monomer unit or combination of such units, where the alkyl substituent preferably has from 3–8 carbon atoms, such as N-tert-butylacrylamide units; x is at least about 0.5, more preferably at least about 0.75, and most preferably at least 0.98; and B comprises any other nonionic monomer unit or combination of such units. Such alkylacrylamide homo- or co-polymer latexes have been found to impart particularly desirable photographic performance in photographic elements. The invention is of course also applicable to homo- or co-polymers of other nonionic monomers which form latex polymers which are unstable upon mixing with gelatin in the presence of calcium ions. Latex dispersions of polymers of relatively high glass transition temperature (Tg), e.g., higher than 60° C. and more preferably higher than 90° C. in the dry state, are particularly preferred.

The latex polymers may contain up to 2 wt % of an anionic co-monomer. Such co-monomers may be, e.g., any convenient vinyl monomer having at least one pendent anionic group, such as a carboxylic acid or carboxylic acid salt moiety (e.g., an ammonium or alkali metal carboxylate), a sulfo or oxysulfo group, or a phosphate group. Specific examples of such monomers include:

1-propene-1,2,3-tricarboxylic acid

2-Propenoic acid

2-Propenoic acid, sodium salt

2-Chloro-2-propenoic acid

2-Propenoic acid, 2-carboxyethyl ether

2-Methyl-2-propenoic acid

2-Methyl-2-propenoic acid, lithium salt
Methylenebutanedioic acid
2-Butenedioic acid
2-Methylbutenedioic acid
2-Methylenepentendioic acid
2-Carboethoxyallyl sulfate, sodium salt
2-Propenoic acid, ester with 4-hydroxy-1-butanesulfonic acid, sodium salt
2-Propenoic acid ester with 4-hydroxy-2-butanesulfonic acid, sodium salt
3-Allyloxy-2-hydroxypropanesulfonic acid, sodium salt
2-Methyl-2-propenoic acid ester with 3-[tertbutyl(2-hydroxyethyl)amino]propane sulfonic acid
Ethenesulfonic acid, sodium salt
Methylenesuccininc acid, diester with 3-hydroxy-1-propane sulfonic acid, disodium salt
2-Methyl-2-propenoic acid ester with 2-(sulfooxy) ethyl sodium salt
N-3-Sulfopropyl acrylamide, potassium salt
2-Methyl-2-propenoic acid, 2-sulfoethyl ester
2-Methyl-2-propenoic acid, 2-sulfoethyl ester, lithium salt
o-Styrene sulfonic acid, ammonium salt
p-Styrene sulfonic acid, potassium salt
p-Styrene sulfonic acid
4-4-Ethenylbenzenesulfonic acid, sodium salt
2-Propenoic acid, 3-sulfopropyl ester, sodium salt
m-Sulfomethylstyrene sulfonic acid, potassium salt
p-Sulfomethylstyrene sulfonic acid, sodium salt
2-Methyl-2-propenoic acid, 3-sulfopropyl ester, sodium salt
2-Methyl-2-propenoic acid, 3-sulfobutyl ester, sodium salt
2-Methyl-2-propenoic acid, 4-sulfobutyl ester, sodium salt
2-Methyl-2-propenoic acid, 2-sulfoethyl ester, sodium salt
2-Methyl-2-[(1-oxo-2-propenyl)amino]-1-propane sulfonic acid
2-Methyl-2-[(1-oxo-2-propenyl)amino]-1-propane sulfonic acid, sodium salt
2-Methyl-2-[(1-oxo-2-propenyl)amino]-1-propane sulfonic acid, potassium salt
2-acrylamido-2-methylpropane sulfonate
2-sulfoethyl methyl-methacrylate Latex polymers generally comprise polymer particles having an average particle diameter of from about 0.02 to 2.0 microns. In a preferred embodiment of the invention, latex particles having an average diameter of from about 0.03 to 0.5 microns are used in the dispersions of the invention. In a more preferred embodiment, latex particles having an average diameter of from about 0.03 to 0.2 microns are used.

The latex polymer average molecular weight generally ranges from about 1000 to 5,000,000 in non-crosslinked form. In a preferred embodiment of the invention, dispersions of latex particles having an average molecular weight of from about 300,000 to 5,000,000 are formed. Dispersions with polymers having high molecular weight such as these are not easily formed by prior processes wherein a solution containing the polymer is emulsified and dispersed. In accordance with a further embodiment of the invention, where the latex polymers comprise crosslinked polymers, their molecular weight may far exceed 5,000,000.

Specific examples of useful polymer latex materials are given below. Copolymer ratios indicated are weight ratios unless otherwise specified.

P-1 Poly(N-tert-butylacrylamide) Tg~146° C.
P-2 N-tert-butylacrylamide/2-acrylamido-2-methylpropane sulfonic acid sodium salt copolymer (99/1)
P-3 N-tert-butylacrylamide/2-acrylamido-2-methylpropane sulfonic acid sodium salt copolymer (98.5/1.5)
P-4 N-tert-butylacrylamide/2-acrylamido-2-methylpropane sulfonic acid sodium salt copolymer (98/2)
P-5 Poly(N-sec-butylacrylamide)
P-6 Poly(N-(1,1-dimethyl-3-oxobutyl)acrylamide)
P-7 N-tert-butylacrylamide/2-hydroxyethylmethacrylate copolymer (80/20)
P-8 N-tert-butylacrylamide/methylene bisacrylamide copolymer (98/2)
P-9 N-(1,1-dimethyl-3-oxobutyl)acrylamide/methylene bisacrylamide copolymer (98/2)
P-10 Poly(glycidyl methacrylate)
P-11 Glycidyl methacrylate/ethylene glycol dimethacrylate copolymer (95/5)
P-12 Poly(4-vinylphenol)
P-13 N-tert-butylacrylamide/3-acrylamido-3-methylbutanoic acid copolymer (99.5/0.5)
P-14 N-tert-butylacrylamide/3-acrylamido-3-methylbutanoic acid copolymer (99.0/1.0)
P-15 N-tert-butylacrylamide/3-acrylamido-3-methylbutanoic acid copolymer (98/2)
P-16 N-tert-butylacrylamide/methyl acrylate copolymer (75/25)
P-17 N-tert-butylacrylamide/methyl acrylate copolymer (50/50)

Suitable free-radical initiators for the polymerization include, but are not limited to the following compounds and classes. Inorganic salts suitable as initiators include potassium persulfate, sodium persulfate, potassium persulfate with sodium sulfite, etc. Peroxy compounds which may be used include benzoyl peroxide, t-butyl hydroperoxide, cumyl hydroperoxide, etc. Azo compounds which may be used include azobis(cyanovaleric acid), azobis (isobutyronitrile), 2,2'-azobis(2-amidinopropane) dihydrochloride, etc. Representative emulsion polymerization synthesis examples of polymer latexes are set forth in copending, commonly assigned U.S. Ser. No. 08/390,400, filed Feb. 17, 1995, incorporated by reference above.

The latex polymers may additionally comprise photographically useful groups covalently bonded thereto, such as groups which function as photographic couplers, (including yellow, magenta and cyan image-forming couplers, colored or masking couplers, inhibitor-releasing couplers, and bleach accelerator-releasing couplers, dye-releasing couplers, etc.), UV absorbers, dyes, reducing agents (including oxidized developer scavengers and nucleators), stabilizers (including image stabilizers, stain-control agents, and developer scavengers), developing agents, optical brighteners, lubricants, etc.

The aqueous phase may include surfactants. Surfactants may be cationic, anionic, zwitterionic or non-ionic. In a preferred embodiment of the invention, an anionic surfactant is included in the coating composition, as the interaction of gelatin at organic/water surfaces has been found to be particularly enhanced by such surfactants. Where the coating composition includes a dispersed liquid organic solution, ratios of surfactant to liquid organic solution typically are in the range of 0.5 to 25 wt. % for forming small particle photographic dispersions, which ratios are also useful for the invention compositions. Useful surfactants include, but are not limited the following.

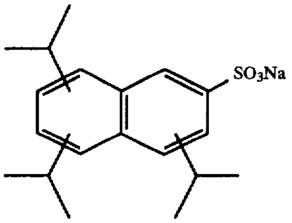
F-1

$CF_3-(CF_2)_7-SO_3Na$ F-2

$CH_3-(CH_2)_n-SO_3Na$ n = 12–14 F-3

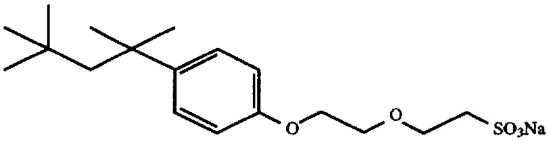
F-4

$CH_3-(CH_2)_{11}-OCO_3Na$ F-5

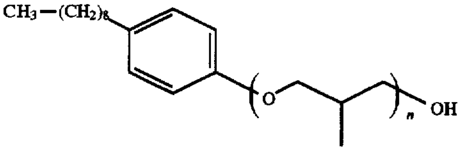
n = ca. 10 F-6

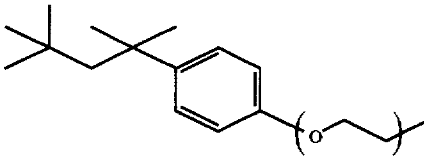
n = ca. 40 F-7

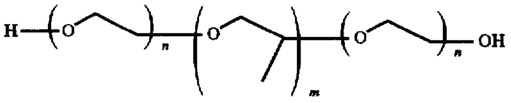
n = ca. 6
m = ca. 22 F-8

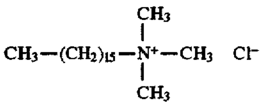
F-9

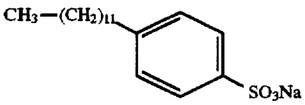
F-10

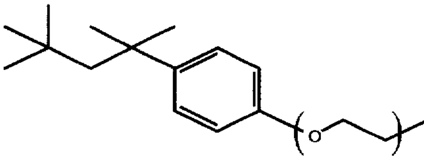
n = ca. 10 F-11

Devices suitable for the dynamic mixing of the coating compositions of the invention include those suitable for preparing submicron photographic emulsified dispersions. These include but are not limited to blade mixers, devices in which a liquid stream is pumped at high pressure through an orifice or interaction chamber, sonication, Gaulin mills, homogenizers, blenders, etc. More than one type of device may be used to prepare the coating compositions and dispersions contained therein.

The process of the invention is generally applicable to forming aqueous coating compositions comprising gelatin and latex dispersions. In preferred embodiments of the invention, such coating compositions further comprise dispersions of photographically useful compounds which may be used at various locations throughout a photographic element.

Photographically useful compounds which can be included in the coating compositions of the invention include photographic couplers (including yellow, magenta and cyan image-forming couplers, colored or masking couplers, inhibitor-releasing couplers, and bleach accelerator-releasing couplers, dye-releasing couplers, etc.), UV absorbers, preformed dyes (including filter dyes), high-boiling organic solvents, reducing agents including oxidized developer scavengers and nucleators), stabilizers (including image stabilizers, stain-control agents, and developer scavengers), developing agents, development boosters, development inhibitors and development moderators, optical brighteners, lubricants, etc.

In a preferred embodiment of the invention, the coating compositions include an image dye-forming coupler dispersion, such as dispersions of couplers that form cyan, magenta, or yellow dyes upon reaction with oxidized color developing agents.

Couplers that form cyan dyes upon reaction with oxidized color developing agents are described in such representative patents and publications as: U.S. Pat. Nos. 2,772,162; 2,895,826; 3,002,836; 3,034,892; 2,474,293; 2,423,730; 2,367,531; 3,041,236; 4,883,746 and "Farbkuppler—Eine Literature Ubersicht," published in Agfa Mitteilungen, Band III, pp. 156–175 (1961). Preferably such couplers are phenols and naphthols that form cyan dyes on reaction with oxidized color developing agent.

Couplers that form magenta dyes upon reaction with oxidized color developing agent are described in such representative patents and publications as: U.S. Pat. Nos. 2,600,788; 2,369,489; 2,343,703; 2,311,082; 3,152,896; 3,519,429; 3,062,653; 2,908,573 and "Farbkuppler—Eine Literature Ubersicht," published in Agfa Mitteilungen, Band III, pp. 126–156 (1961). Preferably such couplers are pyrazolones, pyrazolotriazoles, or pyrazolobenzimidazoles that form magenta dyes upon reaction with oxidized color developing agents.

Couplers that form yellow dyes upon reaction with oxidized and color developing agent are described in such representative patents and publications as: U.S. Pat. Nos. 2,875,057; 2,407,210; 3,265,506; 2,298,443; 3,048,194; 3,447,928 and "Farbkuppler—Eine Literature Ubersicht," published in Agfa Mitteilungen, Band III, pp. 112–126 (1961). Such couplers are typically open chain ketomethylene compounds. In a preferred embodiment of the invention, an acetanilide yellow coupler is used which has the formula:

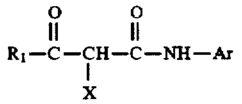

wherein $R_1$ is an alkyl, aryl, anilino, alkylamino or heterocyclic group; Ar is an aryl group; and X is hydrogen or a coupling-off group. The $R_1$, Ar and X groups may each contain further substituents as is well known in the art. $R_1$ is preferably:

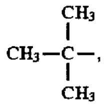,
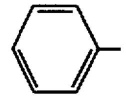,
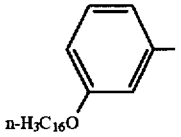

-continued

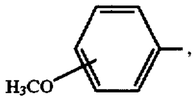,
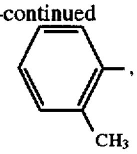,
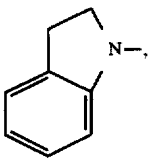

$CF_3-$,
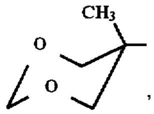,
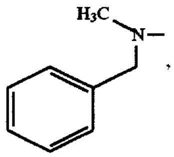,

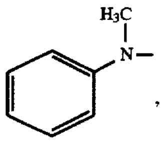, or
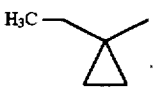.

In particularly preferred embodiments of the invention a pivaloylacetanilide yellow coupler is used wherein $R_1$ is t-butyl.

Ar is preferably substituted phenyl wherein at least one substituent is halo, alkoxy or aryloxy. Ar preferably additionally contains a ballasting group. Ballasting groups usually comprise one or more 5 to 25 carbon atom containing organic moieties whose function is to immobilize the coupler and the formed image dye during photographic development by imparting poor water diffusibility to the coupler compound.

X is a hydrogen or a coupling-off group. Coupling-off groups are generally organic groups which are released during photographic processing. The released coupling-off group can be a photographically useful group.

Coupling-off groups are well known in the art. Such groups can determine the chemical equivalency of a coupler, i.e., whether it is a 2-equivalent or a 4-equivalent coupler, or modify the reactivity of the coupler. Such groups can advantageously affect the layer in which the coupler is coated, or other layers in the photographic recording material, by performing, after release from the coupler, functions such as dye formation, dye hue adjustment, development acceleration or inhibition, bleach acceleration or inhibition, electron transfer facilitation, color correction and the like.

Generally the presence of hydrogen at the coupling site provides a 4-equivalent coupler, and the presence of another coupling-off group usually provides a 2-equivalent coupler. Representative classes of such coupling-off groups include, for example, chloro, alkoxy, aryloxy, hetero-oxy, sulfonyloxy, acyloxy, acyl, heterocyclyl, sulfonamido, mercaptotetrazole, benzothiazole, mercaptopropionic acid, phosphonyloxy, arylthio, and arylazo. These coupling-off groups are described in the art, for example, in U.S. Pat. Nos. 2,455,169; 3,227,551; 3,432,521; 3,476,563; 3,617,291; 3,880,661; 4,052,212; and 4,134,766; and in U.K. Patents and published application Nos. 1,466,728, 1,531,927, 1,533,039, 2,006,755A and 2,017,704A, the disclosures of which are incorporated herein by reference.

It may be useful to use a combination of couplers any of which may contain known ballasts or coupling-off groups such as those described in U.S. Pat. Nos. 4,301,235; 4,853,319 and 4,351,897. The coupler may also be used in association with "wrong" colored couplers (e.g. to adjust levels of interlayer correction) and, in color negative applications, with masking couplers such as those described in EP 213,490; Japanese Published Application 58-172,647; U.S. Pat. No. 2,983,608; German Application DE 2,706, 117C; U.K. Patent 1,530,272; Japanese Application A-113935; U.S. Pat. Nos. 4,070,191 and 4,273,861; and German Application DE 2,643,965. The masking couplers may be shifted or blocked.

Typical couplers that can be used with the coating compositions of this invention include those shown below.

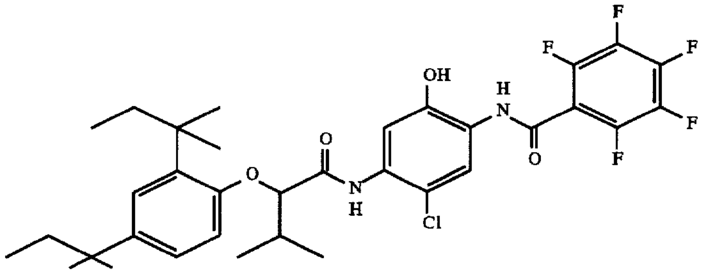

C-1

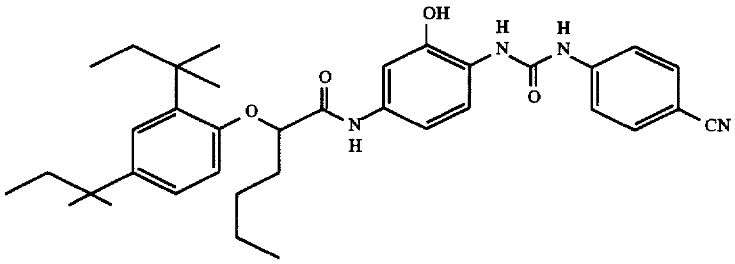

C-2

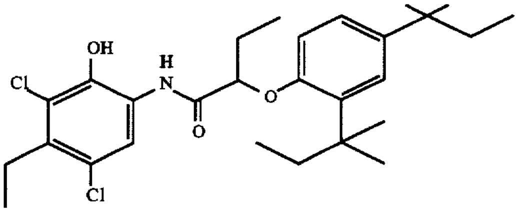

C-3

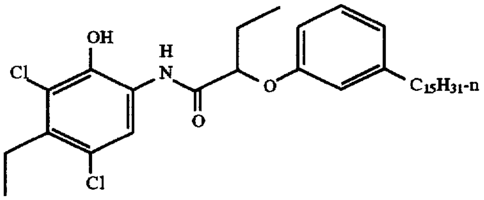

C-4

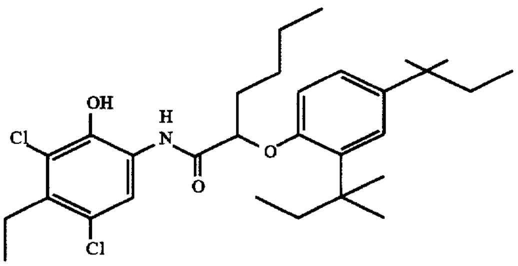

C-5

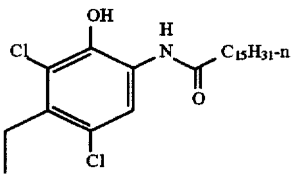

C-6

-continued
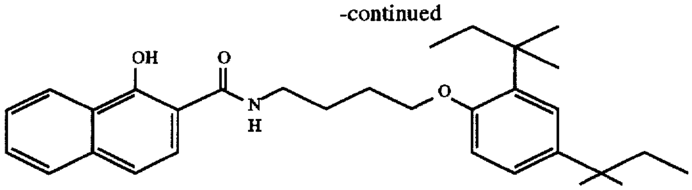
C-7
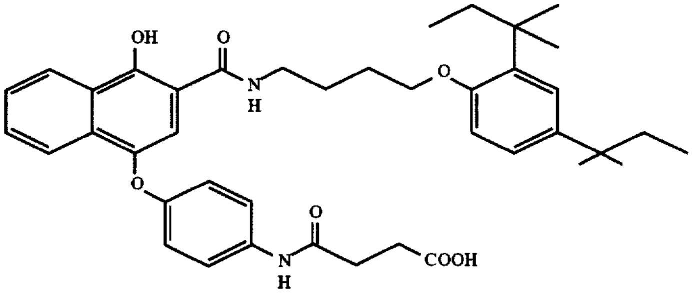
C-8
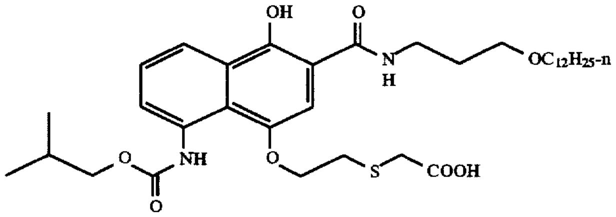
C-9
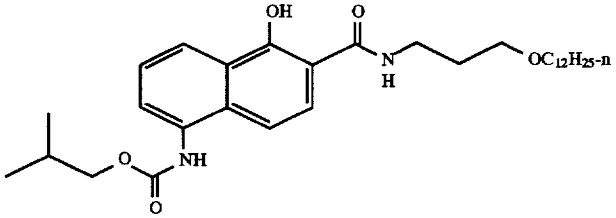
C-10
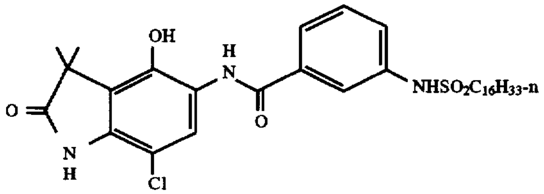
C-11
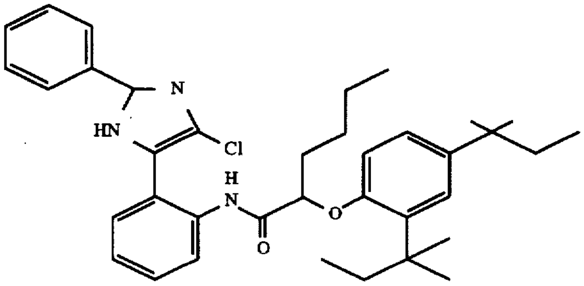
C-12
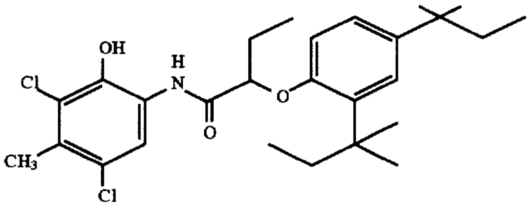
C-13

-continued
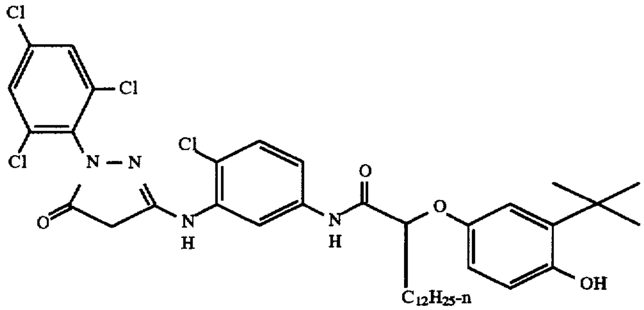
M-1
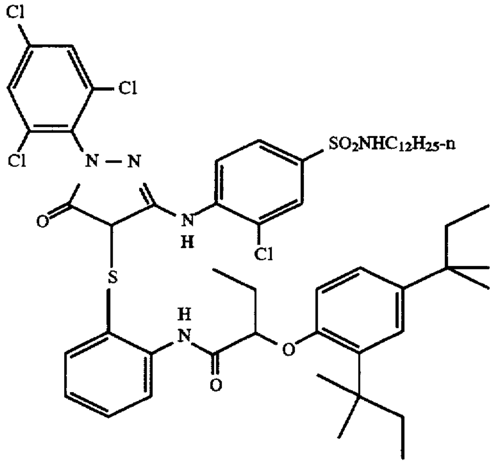
M-2
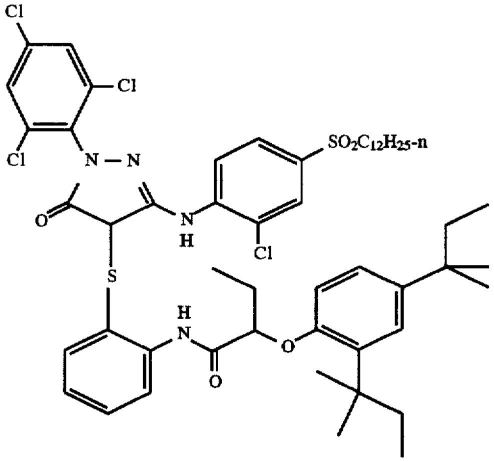
M-3
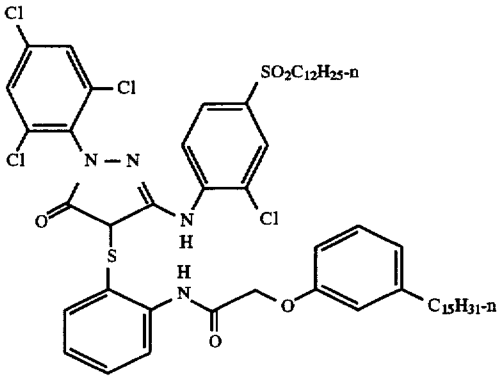
M-4

-continued
M-5
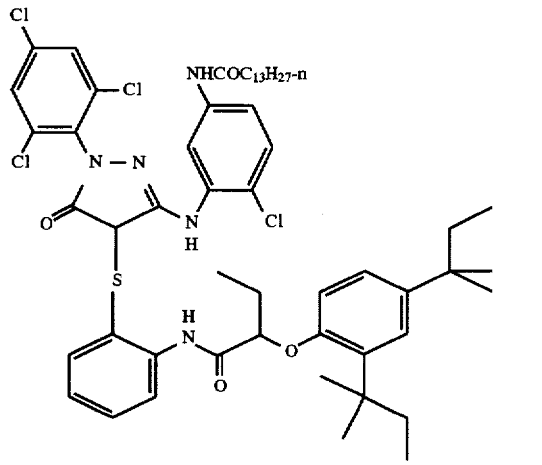
M-6
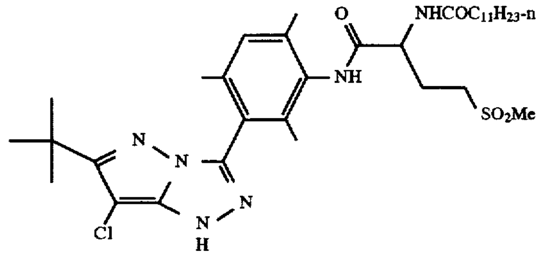
M-7
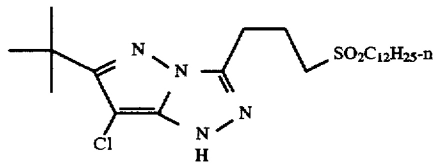
M-8
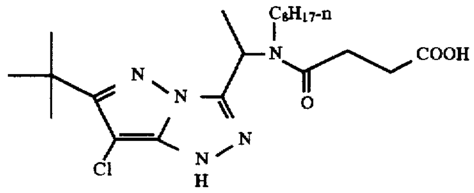
M-9
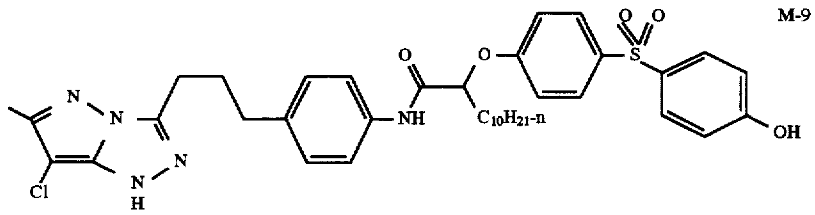

-continued
M-10
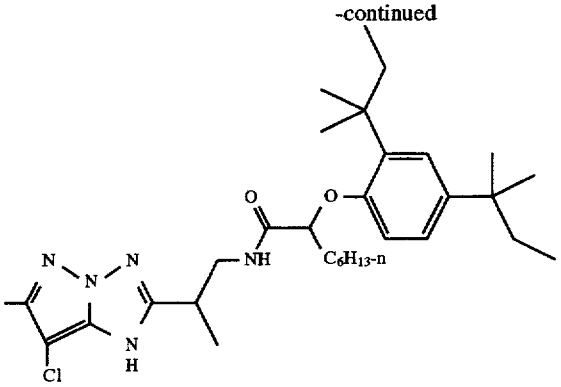
M-11
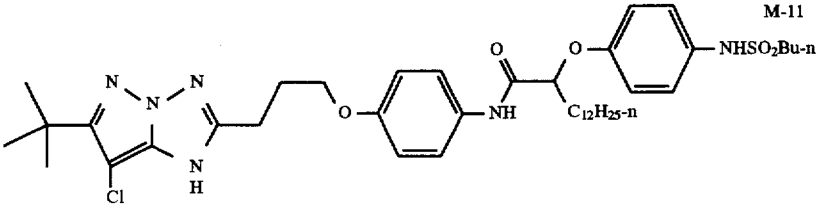
M-12
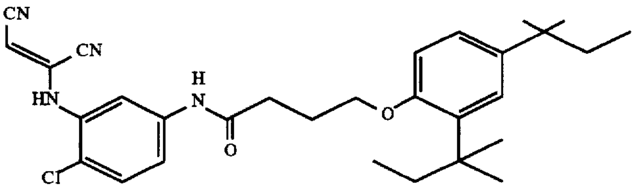
Y-1
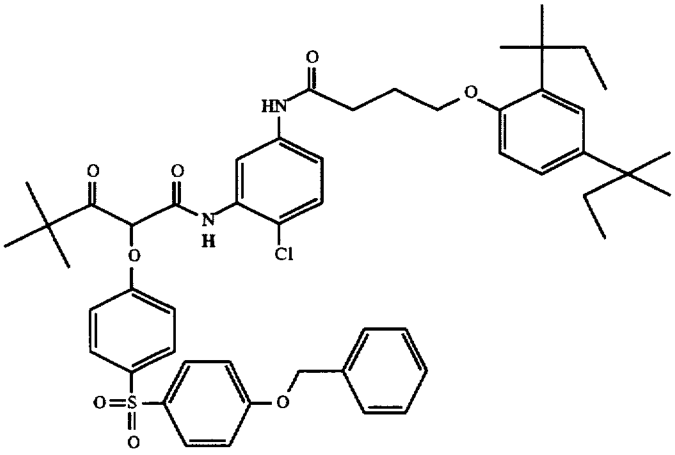
Y-2
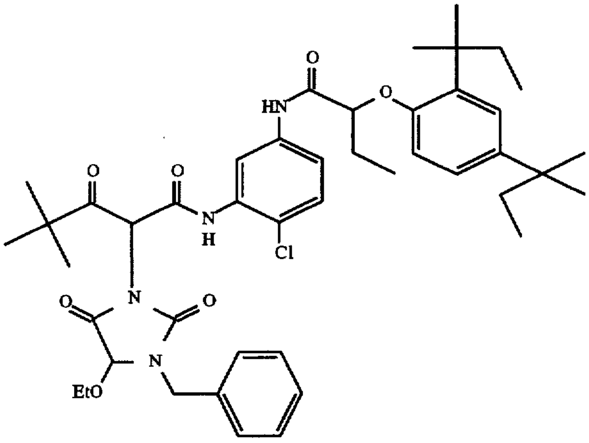

-continued
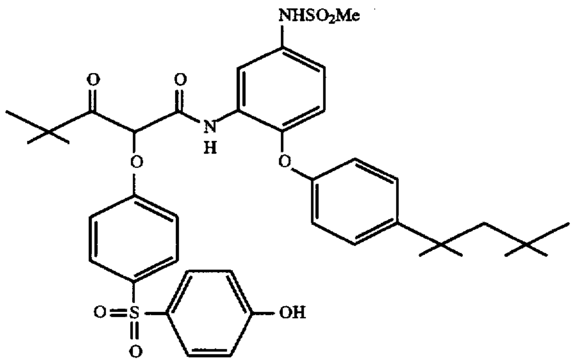
Y-3
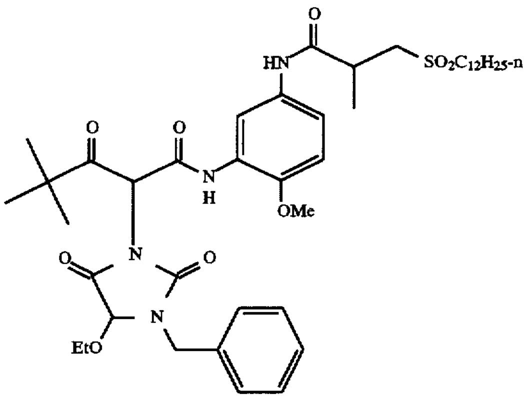
Y-4
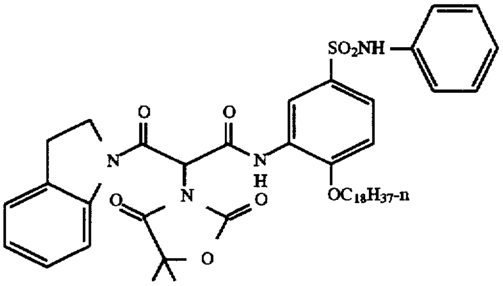
Y-5
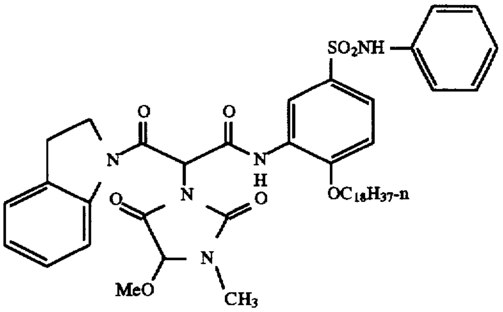
Y-6
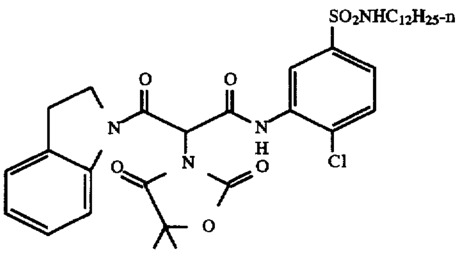
Y-7

-continued
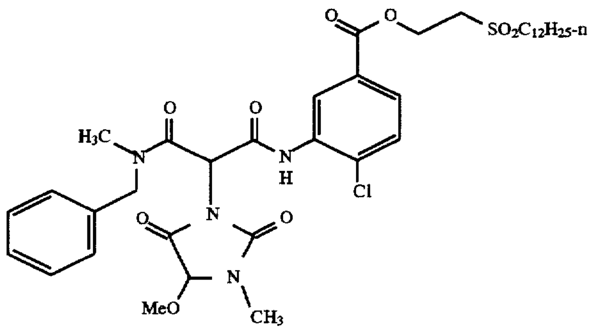
Y-8
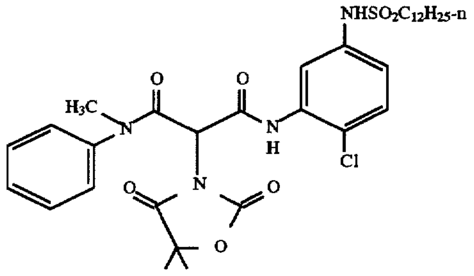
Y-9
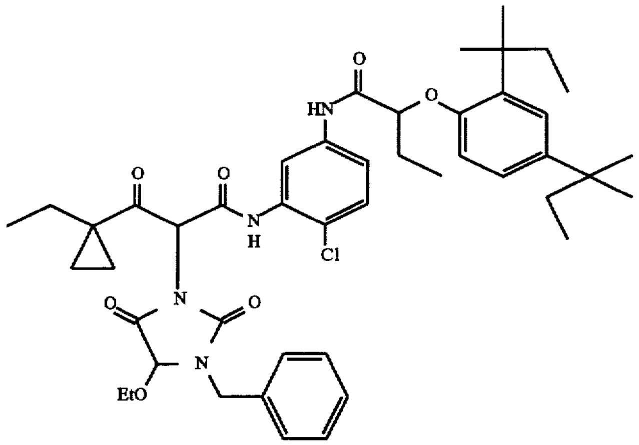
Y-10
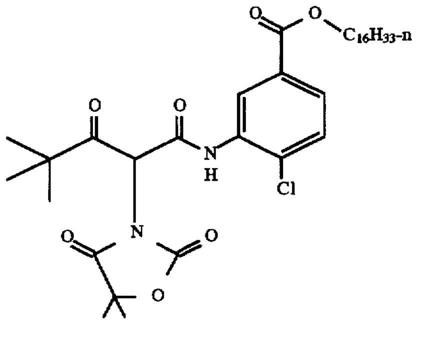
Y-11

-continued
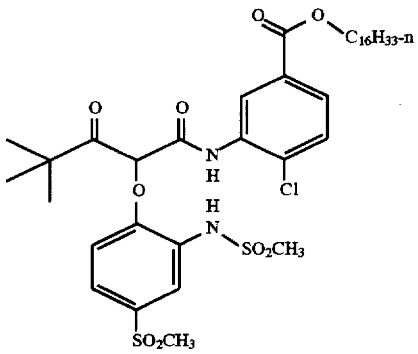
Y-12
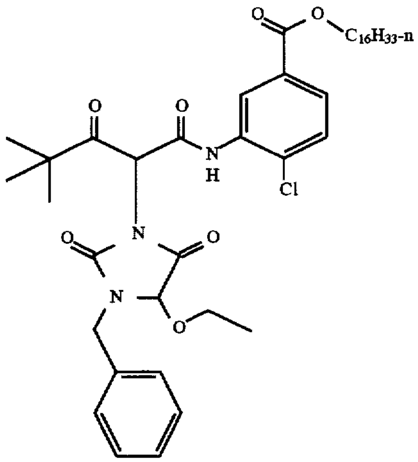
Y-13
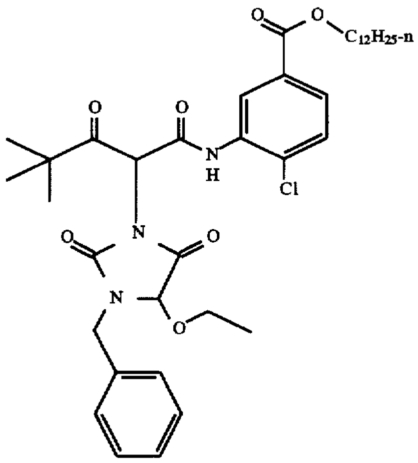
Y-14

-continued

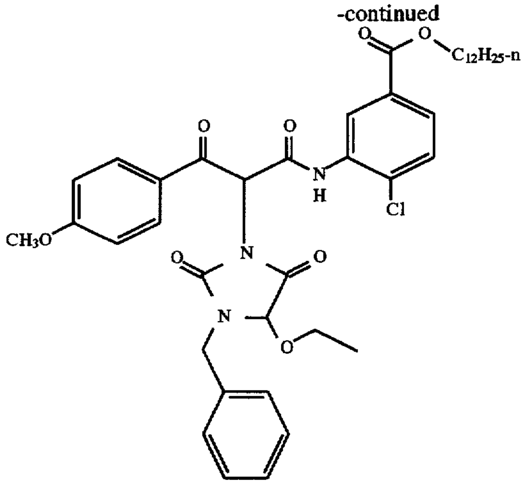

Y-15

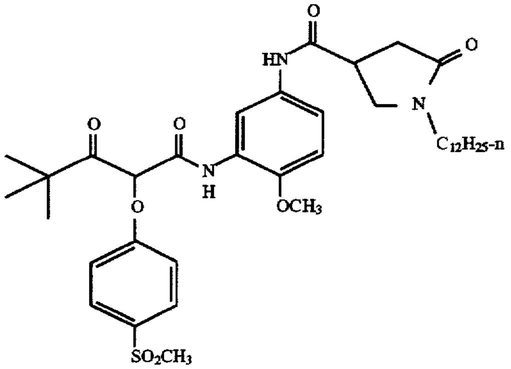

Y-16

The liquid organic, or oil phase, components of any photographically useful compound dispersions included in the coating compositions of the invention may include high-boiling or permanent organic solvents. High boiling solvents have a boiling point sufficiently high, generally above 150° C. at atmospheric pressure, such that they are not evaporated under normal dispersion making and photographic layer coating procedures. Non-limitive examples of high boiling organic solvents that may be used include the following.

| | |
|---|---|
| S-1 | Dibutyl phthalate |
| S-2 | Tritolyl phosphate |
| S-3 | N,N-Diethyldodecanamide |
| S-4 | Tris(2-ethylhexyl)phosphate |
| S-5 | Octyl oleate monoepoxide |
| S-6 | 2,5-Di-t-pentylphenol |
| S-7 | Acetyl tributyl citrate |
| S-8 | 1,4-Cyclohexylenedimethylene bis(2-ethylhexanoate) |
| S-9 | Bis(2-ethylhexyl)phthalate |
| S-10 | 2-phenylethyl benzoate |
| S-11 | Dibutyl sebacate |
| S-12 | N,N-Dibutyldodecanamide |
| S-13 | Oleyl alcohol |
| S-14 | 2-(2-Butoxyethoxy)ethyl acetate |

It is an advantage of the process of the invention that auxiliary solvents are not essential for forming coating solutions containing polymer dispersions, and it is preferred that they not be included. Inclusion of such solvents, however, may be desirable to achieve photographic properties not directly related to the dispersion making process, and their presence will not interfere with the process of the invention. Most useful auxiliary solvents are water immiscible, volatile solvents, and solvents with limited water solubility which are not completely water miscible. Non-limitive examples of these include the following.

| | |
|---|---|
| A-1 | Ethyl acetate |
| A-2 | Cyclohexanone |
| A-3 | 4-Methyl-2-pentanol |
| A-4 | Triethyl phosphate |
| A-5 | Methylene chloride |
| A-6 | Tetrahydrofuran |

The coating compositions of the invention may also include UV stabilizers. Examples of UV stabilizers are shown below.

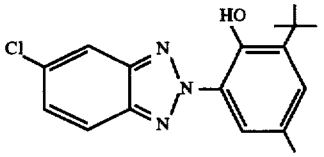

UV-1

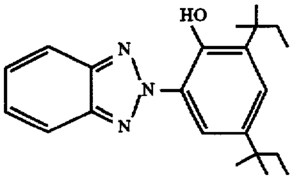

UV-2

-continued

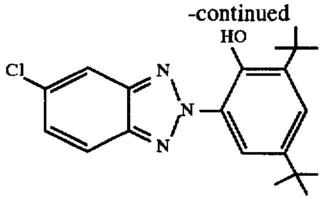

UV-3

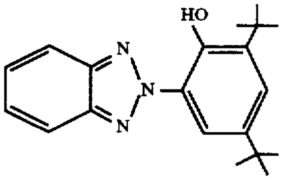

UV-4

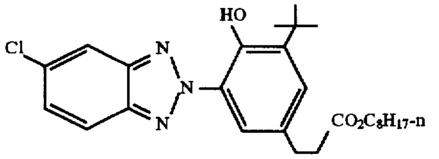

UV-5

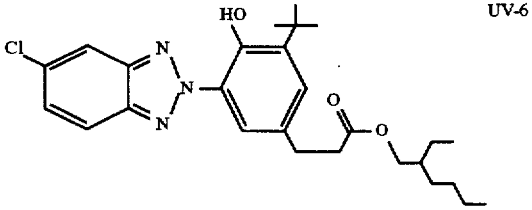

UV-6

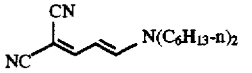

UV-7

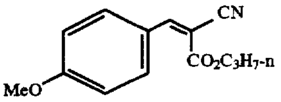

UV-8

The process of the invention may be used to form coating compositions for various layers of various photographic elements, including single color elements or multicolor elements. Multicolor elements contain image dye-forming units sensitive to each of the three primary regions of the spectrum. Each unit can comprise a single emulsion layer or multiple emulsion layers sensitive to a given region of the spectrum. The layers of the element, including the layers of the image-forming units, can be arranged in various orders as known in the art. In an alternative format, the emulsions sensitive to each of the three primary regions of the spectrum can be disposed as a single segmented layer.

A typical multicolor photographic element comprises a support bearing a cyan dye image-forming unit comprised of at least one red-sensitive silver halide emulsion layer having associated therewith at least one cyan dye-forming coupler, a magenta dye image-forming unit comprising at least one green-sensitive silver halide emulsion layer having associated therewith at least one magenta dye-forming coupler, and a yellow dye image-forming unit comprising at least one blue-sensitive silver halide emulsion layer having associated therewith at least one yellow dye-forming coupler. The element can contain additional layers, such as filter layers, interlayers, overcoat layers, subbing layers, and the like. In a preferred embodiment, the loaded latex dispersions of the invention are used in a photographic element that may be displayed for extended periods under illuminated conditions, such as a color paper photographic element which comprises photographic layers coated on a reflective support.

If desired, the photographic element can be used in conjunction with an applied magnetic layer as described in *Research Disclosure*, November 1992, Item 34390 published by Kenneth Mason Publications, Ltd., Dudley House, 12 North Street, Emsworth, Hampshire P010 7DQ, ENGLAND.

In the following discussion of suitable materials for use in the emulsions and elements that can be used in conjunction with this photographic element, reference will be made to *Research Disclosure*, September 1994, Item 36544, available as described above, which will be identified hereafter by the term "*Research Disclosure*." The contents of the *Research Disclosure*, including the patents and publications referenced therein, are incorporated hereinby reference, and the Sections hereafter referred to are Sections of the *Research Disclosure*, Item 36544.

The silver halide emulsions employed in these photographic elements can be either negative-working or positive-working. Suitable emulsions and their preparation as well as methods of chemical and spectral sensitization are described in Sections I, and III–IV. Vehicles and vehicle related addenda are described in Section II. Dye image formers and modifiers are described in Section X. Various additives such as UV dyes, brighteners, luminescent dyes, antifoggants, stabilizers, light absorbing and scattering materials, coating aids, plasticizers, lubricants, antistats and matting agents are described, for example, in Sections VI–IX. Layers and layer arrangements, color negative and color positive features, scan facilitating features, supports, exposure and processing can be found in Sections XI–XX.

Various types of hardeners are useful in conjunction with elements of the invention. In particular, bis(vinylsulfonyl) methane, bis(vinylsulfonyl) methyl ether, 1,2-bis (vinylsulfonyl-acetamido) ethane, 2,4-dichloro-6-hydroxy-s-triazine, triacryloyltriazine, and pyridinium, 1-(4-morpholinycarbonyl)-4-(2-sulfoethyl)-, inner salt are particularly useful. Also useful are so-called fast acting hardeners as disclosed in U.S. Pat. Nos. 4,418,142; 4,618,573; 4,673,632; 4,863,841; 4,877,724; 5,009,990; 5,236,822.

It is also contemplated that the process of the invention may be advantageously used in preparing polymer latex containing layers in combination with the specific materials and processes described in an article titled "Typical and Preferred Color Paper, Color Negative, and Color Reversal Photographic Elements and Processing," published in *Research Disclosure*, February 1995, Volume 370.

Color paper elements typically contain less than 0.80 $g/m^2$ of total silver. Due to the need to decrease the environmental impact of color paper processing, it is desired to decrease the amount of total silver used in the element as much as possible. Therefore, total silver levels of less than 0.65 $g/m^2$ are preferable, and levels of 0.55 $g/m^2$ are even more preferable. It is possible to reduce further the total silver used in the color paper photographic element to less than 0.10 $g/m^2$ by use of a so-called development amplication process whereby the incorporated silver is used only to form the latent image, while another oxidant, such as hydrogen peroxide, serves as the primary oxidant to react with the color developer. Such processes are well-known to the art, and are described in, for example, U.S. Pat. Nos. 4,791,048; 4,880,725; and 4,954,425; EP 487,616; International Published Patent Applications Nos. WO 90/013,059; 90/013,061; 91/016,666; 91/017,479; 92/001,972; 92/005,471; 92/007,299; 93/001,524; 93/011,460; and German published patent application OLS 4,211,460.

EXAMPLE 1

Dispersion 1—1 was made by dissolving 3158 g of yellow coupler Y-3 in 1522 g of coupler solvent S-1, heating the mixture to 141° C. 2600 g of non-DI LPO gelatin was dissolved in 32,320 g of deionized water at 80° C. 2400 g of surfactant Alkanol-XC™ (10% in water) was added to the gelatin solution, followed by 8001 g of poly t-butylacrylamide (P-1) latex. The gelatin phase and yellow coupler Y-3/coupler solvent S-1 oil phase were mixed together (educted) to form a premix which was homogenized at 5000 psi. Alkanol-XC™ is an anionic polyisopropylnaphthalene sulfonate surfactant supplied by DuPont.

Dispersions 1-2 and 1-3 were made according to the procedure described for dispersion 1-1, using the amounts of each component as specified in Table 1. Dispersion 1-3 differs from 1—1 and 1-2 in that DI LPO gelatin was used for this dispersion. Table I also shows the ppm of calcium in the gelatin types used in this example, as well as the calculated calcium concentrations and molarities in the gelatin/water/surfactant solution prior to the addition of the P-1 latex.

TABLE I

Dispersion formulae and gelatin types used for dispersions of Example 1.

| Dispersion | 1-1 comparison | 1-2 comparison | 1-3 invention |
|---|---|---|---|
| yellow coupler Y-3 | 3158 | 1000 | 4500 |
| coupler solvent S-1 | 1522 | 560 | 2520 |
| Gelatin | 2600 | 794 | 3900 |
| DI Water | 32320 | 6183 | 51000 |
| P-1 (30%) | 8001 | 2000 | 9000 |
| Alkanol-XC | 2400 | 562 | 3600 |
| (10% in water) | | | |
| Total | 50001 | 11099 | 74520 |
| Gel Type | non-DI LPO | non-DI LPO | DI LPO |
| $Ca^{2+}$ ppm | 3000 | 3000 | 50 |
| $[Ca^{2+}]$, mM | 5.57 | 8.52 | 0.09 |
| Appearance | flocs | flocs | no flocs |

Dispersion 1—1 had small flocs that were difficult to filter through a membrane filter at 82° C. and 3 L/min, with filter backpressures of 20 psi. Several makes of this formula in one week caused considerable homogenizer mechanical seal wear. Coatings with this dispersion contained many particles that were visible with an unaided eye and produced a "sandpaper"—like texture.

Dispersion 1-2 produced solid "strings" of P-1 latex as a result of making the premix. The premix was not homogenized. The process equipment was very difficult to clean.

Dispersion 1-3 was made with DI LPO gelatin. This dispersion filtered at 40° C. and 15 L/min with filter backpressure never exceeding 10 psi. This was a remarkable improvement in dispersion quality compared to Dispersions 1—1 and 1-2. Coatings of this dispersion were substantially defect free.

Latex flocs were observed in dispersions 1—1 and 1-2. Only when dispersion 1-3 was made with DI LPO gelatin was the destabilization of the latex eliminated. It is surprising that the P-1 latex should be destabilized by calcium from the gelatin, when it is expected that the gelatin should sterically stabilize the latex even if the charge stabilization is reduced. Example 2 below further demonstrates that the P-1 latex is not as readily stabilized to ions by gelatin as some comparison latexes are.

EXAMPLE 2

Critical coagulation concentrations of various polymer latexes were measured with and without the presence of gelatin as described below. Polymer P-1 is poly t-butylacrylamide homopolymer and polymers P-2 through P-4 are copolymers of t-butylacrylamide monomer and small weight fractions (1%, 1.5%, and 2%, respectively) of 2-acrylamido-2-methylpropane sulfonate, sodium salt, monomer in accordance with the invention, while comparison polymer CP-1 is a copolymer of 90 wt % t-butylacrylamide monomer and 10 wt % of 2-acrylamido-2-methylpropane sulfonate, sodium salt, monomer. Comparison polymers CP-2, CP-3, and CP-4 are, respectfully, poly(methyl methacrylate), a copolymer of 95 wt % methyl methacrylate and 5 wt % 2-sulfoethyl methyl methacrylate monomers, and a copolymer of 95 wt % methyl methacrylate and 5 wt % 2-acrylamido-2-methylpropane sulfonate, sodium salt, monomers.

The experiments were carried out by preparing 5 mL samples of solutions containing 1% latex together with varying concentrations of $Ca(NO)_3$ ranging in small increments from 0 to 80 mM. In the solutions containing gelatin, the gelatin concentration was 5%. The solutions were made in duplicate; were stored for 24 h at 48° C., and then examined visually for the increase in turbidity associated with coagulation of the latex. The concentration of Ca at which this increase occurred was recorded as the critical coagulation concentration. The results are shown in Table II.

TABLE II

Critical Coagulation Concentrations of Various Latexes with and without Gelatin

| Latex | A: w/o gelatin (CCC, mM) | B: w/gelatin (CCC, mM) |
|---|---|---|
| P-1 | 4 | 20 |
| P-2 | 4 | >80 |
| P-3 | 4 | >80 |
| P-4 | 8 | >80 |
| CP-1 | >80 | >80 |
| CP-2 | 3-4 | >80 |
| CP-3 | 40 | >80 |
| CP-4 | 4 | >80 |

P-1 and CP-2 are similarly sensitive to salt in the absence of gelatin. The addition of gelatin to CP-2, however, affords complete protection up to 80 mM Ca, while similar addition to P-1 only improves the stability slightly from 4 to 20 mM. The addition of anionic monomer in latexes P-2, P-3, P-4, and CP-1 is seen to improve the quiescent stability of the latex to calcium ions in gelatin solutions.

EXAMPLE 3

Melt 3-1 was prepared by dissolving 8.32 g of non-DI LPO gelatin (3000 ppm calcium) in 70.71 g deionized water at 80° C. 20.97 g of P-1 latex was added to the gelatin solution while mixing the gelatin solution with a magnetic stirrer. Melts 3-2 and 3—3 were similarly prepared, using APO gelatin (150 ppm calcium) and DI LPO gelatin (50 ppm calcium) respectively.

To prepare melt 3-4, a bulk gelatin solution was prepared by dissolving 62.56 g of DI LPO gelatin in 487.44 g of demineralized water at 50° C. 5.9 g of additional deionized water was added to a 79 g aliquot of the bulk gelatin solution. With enough stirring from a magnetic mixer to produce a small vortex, 21 g of P-1 latex (30% solids) was added to the aliquot of bulk gelatin solution. Melts 3-5 through 3-7 were made as melt 3-4, with 0.5, 1.0, and 2.0 ml of 803 mM $CaCl_2$ solution added to the gelatin solutions prior to latex addition, respectively. The $CaCl_2$ solution was prepared by dissolving 2.95 g of $CaCl_2{\cdot}2H_2O$ in 25 ml of deionized water. (32.18 g $Ca^{2+}$/L, 803 mM)

10 ml of each of melts 3-1 through 3-7 was poured into a test tube for visual comparison of relative turbidity.

TABLE III

Calcium Concentrations and Results from Example 3.

| Melt | Gel Type | [Ca2+], mM before latex | Visual Turbidity |
|---|---|---|---|
| 3-1 comparison | non-DI LPO | 7.88 | Very High |
| 3-2 invention | APO | 0.39 | Low |
| 3-3 invention | DI LPO | 0.13 | Low |
| 3-4 invention | DI LPO | 0.13 | Low |
| 3-5 comparison | DI LPO | 4.83 | High |
| 3-6 comparison | DI LPO | 9.48 | High |
| 3-7 comparison | DI LPO | 18.61 | Very High |

Comparison of melts 3-2 and 3—3 with melt 3-1 showed that using the APO and LPO gelatins with low calcium content enables addition of the P-1 latex to the gelatin without destabilizing the latex, as indicated by the differences in turbidity.

The change in turbidity observed between melts 3-4 and 3-5 was indicative of destabilization of the latex when the gelatin solution had a calcium concentration of as low as 4.83 mM.

EXAMPLE 4

Dispersions 4-1 was prepared as follows: 83.4 g yellow coupler Y-11 was dissolved in 41.7 g coupler solvent S-1 and heated to 100° C. 94.5 g of non-DI LPO gelatin was added to 649.5 g of demineralized water and heated to 80° C. 540 g of 30% solids P-1 latex was added to the gelatin while mixing at 8000 rpm with a Brinkmann rotor-stator mixer. This was followed by addition of 94.5 g Alkanol-XC™ (10% in water) to the gelatin/latex solution. The oil phase was added to the gelatin phase and mixed for 2 minutes, then passed once through a homogenizer at 5000 psi.

Dispersions 4-2 and 4-3 were prepared as 4-1 using DI LPO and AP0 gelatins respectively. The gelatin phase calcium concentrations for each dispersion is set forth in Table IV.

TABLE IV

Results for Example 4.

| Disp ID | 4-1 comparison | 4-2 invention | 4-3 invention |
|---|---|---|---|
| Appearance | Many flocs | no flocs | no flocs |
| Gel Type | non-DI LPO | DI LPO | APO |
| Ca2+ ppm | 3000 | 50 | 150 |
| [Ca2+], mM | 9.51 | 0.16 | 0.48 |

By microscopic evaluation, Dispersions 4-2 and 4-3 were determined to be free of latex flocs. Dispersion 4-1 contained latex flocs.

EXAMPLE 5

Dispersions 5-1 was prepared as follows: 100.47 g yellow coupler Y-11 was dissolved in 68.62 g coupler solvent S-1 and heated to 100° C. 111.42 g of non-DI LPO gelatin was added to 800.31 g of demineralized water and heated to 80° C. 2.55 g of a 0.7% aqueous solution of Kathon™ (primarily 5-chloro-2-methyl isothiazolone biocide) and 334.85 g of 30% solids P-2 latex was added to the gelatin while mixing at 8000 rpm with a Brinkmann rotor-stator mixer. This was followed by addition of 81.78 g Alkanol-XC™ (10% in water) to the gelatin/latex solution. The oil phase was added to the gelatin phase and mixed for 2 minutes, then passed once through a homogenizer at 5000 psi.

Dispersions 5-2, 5-3, 5-5, 5-6, 5-7, 5-9, 5-10 were prepared as Dispersion 5-1, varying the latex composition and gelatin type as indicated in Table V below. DI-CFG is a deionized, clarified food grade lime-processed ossein gelatin of differing molecular weight distribution from conventional photographic lime-processed ossein gelatin.

Dispersions 5-4 was prepared as 5-1, except 727.93 g of demineralized water was added to the gelatin and 407.24 g of 23% solids CP-2 (poly(methyl methacrylate)) latex was added to the gelatin solution.

Dispersion 5-8 was prepared as 5-4, using DI LPO gelatin instead.

Melts of these dispersions were prepared by taking 425 g of each dispersion, adding 75 g of demineralized water, and heating to 50° C. These solutions were then filtered at 45° C. under pressure through a glass fiber filter, measuring the weight of melt collected after passing through the filter versus time.

TABLE V

Dispersion formulae for Example 5.

| ID | Latex | Gelatin | Gel Ca content | [Ca2+] mM | Flocs | Time to filter | |
|---|---|---|---|---|---|---|---|
| 5-1 | P-2 | non-DI LPO | 3000 ppm | 9.1 | many | plug @ 1 s | comparison |
| 5-2 | P-4 | non-DI LPO | " | 9.0 | none | plug @ 410 s | comparison |
| 5-3 | CP-1 | non-DI LPO | " | 9.0 | none | >1000 s | comparison |
| 5-4 | CP-2 | non-DI LPO | " | 9.9 | none | 640 s | comparison |
| 5-5 | P-2 | DI LPO | 50 ppm | 0.15 | none | >860 s | invention |
| 5-6 | P-4 | DI LPO | " | 0.15 | none | >960 s | invention |
| 5-7 | CP-1 | DI LPO | " | 0.15 | none | 620 s | comparison |
| 5-8 | CP-2 | DI LPO | " | 0.17 | none | >960 s | comparison |
| 5-9 | P-2 | DI-CFG/ non-DI LPC | 1270 ppm | 3.9 | some | plug @ 110 s | comparison |
| 5-10 | P-2 | APO | 150 ppm | 0.5 | none | 125 s | invention |

By microscopic evaluation, Dispersions 5-1 and 5-9 were the only dispersions determined to contain latex flocs. However, filtration of these melts was more sensitive to floc content, as not only did Dispersions 5-1 and 5-9 plug completely, but 5-2 did as well. From these data it is apparent that 2% anionic monomer addition is not enough to protect the unstable poly(t-butylacrylamide) latex from being destabilized. Reduction of the calcium concentration to 3.9 mM is also observed to be inadequate to prevent plugging.

EXAMPLE 6

A photographic element is prepared by coating the following layers on a paper support.

| LAYER | COMPONENT | AMOUNT |
|---|---|---|
| 7 | ST-4 | 0.022 g/m$^2$ |
| | S-1 | 0.065 g/m$^2$ |
| | F-1 | 0.009 g/m$^2$ |
| | F-2 | 0.004 g/m$^2$ |
| | Dye-1 | 0.018 g/m$^2$ |
| | Dye-2 | 0.009 g/m$^2$ |
| | Dye-3 | 0.007 g/m$^2$ |
| | Gelatin | 1.076 g/m$^2$ |
| 6 | UV-1 | 0.049 g/m$^2$ |
| | UV-2 | 0.279 g/m$^2$ |
| | ST-4 | 0.080 g/m$^2$ |
| | S-8 | 0.109 g/m$^2$ |
| | S-1 | 0.129 g/m$^2$ |
| | Gelatin | 0.630 g/m$^2$ |
| 5 | AG-3 Red sensitive Ag | 0.218 g Ag/m$^2$ |
| | C-3 | 0.423 g/m$^2$ |
| | S-1 | 0.232 g/m$^2$ |
| | S-14 | 0.035 g/m$^2$ |
| | ST-4 | 0.004 g/m$^2$ |
| | Gelatin | 1.087 g/m$^2$ |
| 4 | UV-1 | 0.049 g/m$^2$ |
| | UV-2 | 0.279 g/m$^2$ |
| | ST-4 | 0.080 g/m$^2$ |
| | S-8 | 0.109 g/m$^2$ |
| | S-1 | 0.129 g/m$^2$ |
| | Gelatin | 0.630 g/m$^2$ |
| 3 | AG-2 Green sensitive Ag | 0.263 g Ag/m$^2$ |
| | M-1 | 0.389 g/m$^2$ |
| | S-1 | 0.195 g/m$^2$ |
| | S-14 | 0.058 g/m$^2$ |
| | ST-2 | 0.166 g/m$^2$ |
| | ST-4 | 0.039 g/m$^2$ |
| | Gelatin | 1.270 g/m$^2$ |
| 2 | ST-4 | 0.094 g/m$^2$ |
| | S-1 | 0.282 g/m$^2$ |
| | ST-14 | 0.065 g/m$^2$ |
| | F-1 | 0.002 g/m$^2$ |
| | Gelatin | 0.753 g/m$^2$ |
| 1 | AG-1 Blue sensitive Ag | 0.243 g Ag/m$^2$ |
| | Y-11 | 0.538 g/m$^2$ |
| | P-2 | 0.538 g/m$^2$ |
| | F-1 | 0.009 g/m$^2$ |
| | ST-6 | 0.237 g/m$^2$ |
| | S-1 | 0.301 g/m$^2$ |
| | ST-15 | 0.009 g/m$^2$ |
| | glycerol | 0.162 g/m$^2$ |
| | Gelatin | 1.042 g/m$^2$ |
| Support | Polyethylene laminated paper with $TiO_2/ZnO$ in the polyethylene laminated in the first layer side. | |

Bis(vinylsulfonylmethyl) ether (1.97% to total gelatin weight) is added as hardener.

Silver chloride emulsions are chemically and spectrally sensitized as described below.

AG-3 Red Emulsion

A high chloride silver halide emulsion is precipitated by equimolar addition of silver nitrate and sodium chloride solutions into a well-stirred reactor containing gelatin peptizer and thioether ripener. The resultant emulsion contains cubic shaped grains of 0.40 μm in edgelength size. This emulsion is optimally sensitized by the addition of water insoluble gold compound followed by a heat ramp, and further additions of 1-(3-acetamidophenyl)-5-mercaptotetrazole, potassium bromide and red sensitizing dye RSD-1. In addition, iridium and ruthenium dopants are added during the sensitization process.

AG-2 Green Emulsion

A high chloride silver halide emulsion is precipitated by equimolar addition of silver nitrate and sodium chloride solutions into a well-stirred reactor containing gelatin peptizer and thioether ripener. $Cs_2Os(NO)Cl_5$ dopant is added during the silver halide grain formation for most of the precipitation, followed by a shelling without dopant. Iridium dopant is added during the late stage of grain formation. The resultant emulsion contains cubic shaped grains of 0.30 μm in edgelength size. This emulsion is optimally sensitized with green sensitizing dye GSD-1, water insoluble gold compound, heat digestion followed by the addition of 1-(3-acetamidophenyl)-5-mercaptotetrazole and potassium bromide.

AG-1 Blue Emulsion

A high chloride silver halide emulsion is precipitated by equimolar addition of silver nitrate and sodium chloride solutions into a well-stirred reactor containing gelatin peptizer and thioether ripener. $Cs_2OS(NO)Cl_5$ is added during the silver halide grain formation for most of the precipitation, followed by shelling without dopant. The resultant emulsion contains cubic shaped grains of 0.74 μm in edgelength size. This emulsion is optimally sensitized by the addition of water insoluble gold compound and heat ramped up to 60° C. during which time blue sensitizing dye BSD-1,1-(3-acetamidophenyl)-5-mercaptotetrazole and potassium bromide are added. In addition, iridium dopant are added during the sensitization process.

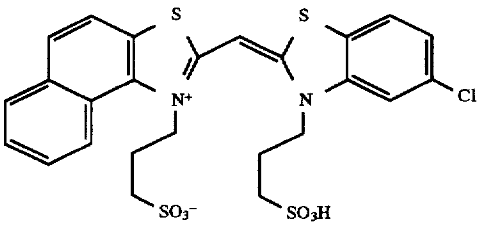

BSD-1

-continued
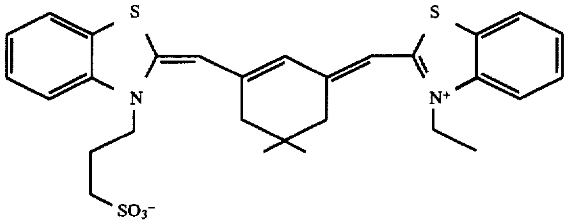
RSD-1
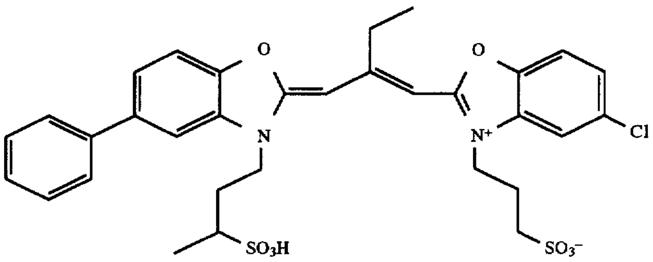
GSD-1
Absorber dyes:
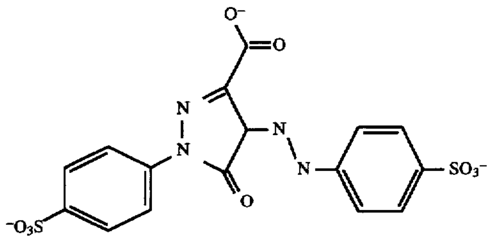
Dye-1
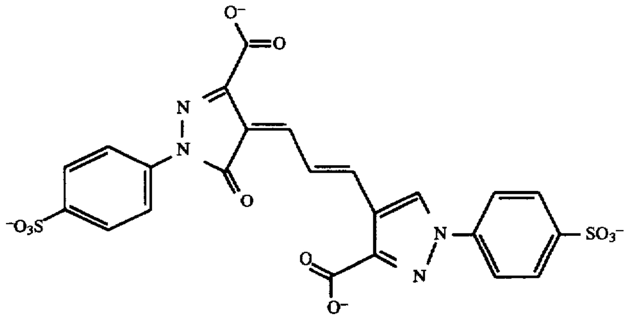
Dye-2
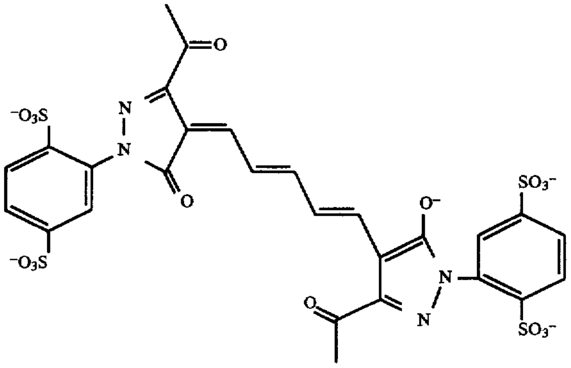
Dye-3

-continued
Stabilizers:
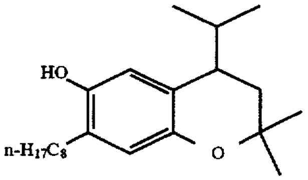
ST-2
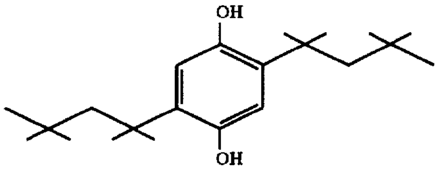
ST-4
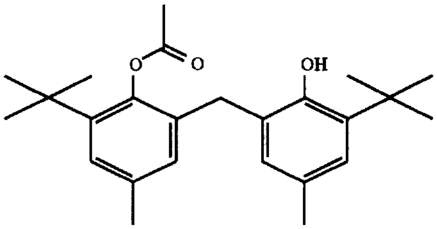
ST-6
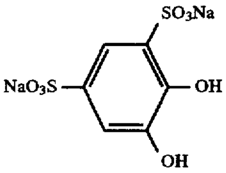
ST-14
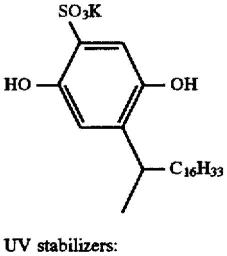
ST-15
UV stabilizers:
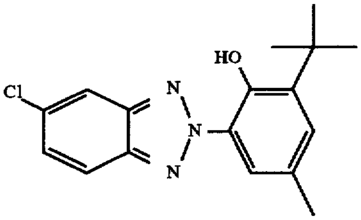
UV-1
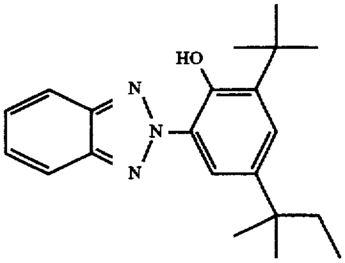
UV-2
The coating composition for Layer 1 is formed by mixing a liquid organic phase comprising coupler Y-11 and high-boiling solvent S-1 with an aqueous solution containing gelatin and surfactant F-1, and then mixing the resulting combination in a homogenizer with another aqueous solution containing a polymer latex dispersion of P-2. The photographic elements of the invention may exhibit improved performance in many cases, including enhanced sensitometric performance, improved image permanence and greater physical durability.

While the invention has been described in detail and with reference to specific embodiments thereof, it will be apparent to one skilled in the art that various changes and modifications can be made therein without departing from the spirit and scope thereof.

What is claimed is:

1. A process for forming a photographic coating composition comprising mixing an aqueous solution comprising gelatin with a latex dispersion of a polymer of the formula $$(A)_x(B)_y(C)_z$$

where

A and B are formed from nonionic monomers,

C is formed from an anionic monomer, and x, y and z are monomer weight fractions where x=0 to 1.0, y=0 to 1.0, x+y=about 0.98 to 1.0, and z=0 to about 0.02, wherein A, B, x and y are such that latex dispersions of polymers of the formula $(A)_x(B)_y$ have calcium ion critical coagulation concentrations of less than 80 mM $Ca^{+}2$ in gelatin solutions, wherein the gelatin of the aqueous solution mixed with the latex dispersion comprises a gelatin of low calcium ion content such that the coating composition has a calcium $Ca^{2+}$ concentration of less than 2 mM.

2. The process of claim 1, wherein the gelatin comprises an acid-processed or deionized lime-processed gelatin.

3. The process of claim 1, further comprising mixing with said aqueous gelatin solution and latex dispersion a liquid organic phase comprising one or more hydrophobic photographically useful compounds and one or more high-boiling solvents.

4. The process of claim 3, wherein the mixing of the aqueous gelatin solution, latex dispersion, and liquid organic phase comprises high shear or turbulent mixing performed by means of a homogenizer, a microfluidizer, a Gaulin mill, a colloid mill, a high pressure orifice, submerged jet or interaction chamber, a blade mixer, or a sonication or ultrasound device.

5. The process of claim 3, wherein the liquid organic phase is first combined with an aqueous solution containing gelatin and surfactant, and the resulting combination is then mixed with another aqueous solution containing the polymer latex dispersion.

6. The process of claim 3, wherein the hydrophobic photographically useful compound is selected from the group consisting of: photographic couplers, UV absorbers, preformed dyes, high-boiling organic solvents, reducing agents, stabilizers, developing agents, development boosters, development inhibitors and development moderators, optical brighteners, and lubricants.

7. The process of claim 6 in which the hydrophobic photographically useful compound is a photographic coupler.

8. The process of claim 7 wherein the hydrophobic photographically useful compound is an acetanilide yellow dye-forming coupler.

9. The process of claim 8 wherein the hydrophobic photographically useful compound is a pivaloylacetanilide yellow dye-forming coupler.

10. The process of claim 1, wherein the gelatin comprises an acid-processed gelatin.

11. A process for forming a photographic coating composition comprising mixing an aqueous solution comprising gelatin with a latex dispersion of a polymer of the formula $$(A)_x(B)_y(C)_z$$

where

A and B are formed from nonionic monomers,

C is formed from an anionic monomer, and x, y and z are monomer weight fractions where x=1.0 to 1.0, y=0 to 1.0, x+y=about 0.98 to 1.0, and z=0 to about 0.02, wherein A, B, x and y are such that latex dispersions of polymers of the formula $(A)_x(B)_y$ have calcium ion critical coagulation concentrations of less than 80 mM $Ca^{+2}$ in gelatin solutions, wherein the gelatin of the aqueous solution mixed with the latex dispersion comprises a deionized lime-processed gelatin of low calcium ion content such that the coating composition has a calcium $Ca^{2+}$ concentration of less than 2 mM.

12. The process of claim 1 in which the polymer latex is formed by free-radical emulsion polymerization.

13. The process of claim 12 in which the polymer latex comprises a crosslinked polymer.

14. The process of claim 1 in which the polymer latex comprises at least 50 wt % N-alkylacrylamide monomer units.

15. The process of claim 14 in which the polymer latex is a t-butylacrylamide homo- or co-polymer latex.

16. The process of claim 1 in which the polymer latex comprises a polymer having a Tg greater than 90° C. in the dry state.

17. The process of claim 1 in which the polymer latex comprises polymer particles having an average diameter of from 0.03–0.2 μm.

18. The process of claim 1 in which the polymer latex average molecular weight is from 300,000–5,000,000.

19. The process of claim 1 wherein the mixing comprises high shear or turbulent mixing performed by means of a homogenizer, a microfluidizer, a Gaulin mill, a colloid mill, a high pressure orifice, submerged jet or interaction chamber, a blade mixer, or a sonication or ultrasound device.

20. A photographic coating composition comprising an aqueous gelatin solution and a latex dispersion of a polymer of the formula $$(A)_x(B)_y(C)_z$$

where

A and B are formed from nonionic monomers,

C is formed from an anionic monomer, and x, y and z are monomer weight fractions where x=0 to 1.0, y=0 to 1.0, x+y=about 0.98 to 1.0, and z=0 to about 0.02, wherein A, B, x and y are such that latex dispersions of polymers of the formula $(A)_x(B)_y$ have calcium ion critical coagulation concentrations of less than 80 mM $Ca^{+2}$ in gelatin solutions, wherein the gelatin of the aqueous gelatin solution comprises a gelatin of low calcium ion content such that the coating composition has a calcium $Ca^{2+}$ concentration of less than 2 mM.

21. The coating composition of claim 20, wherein the gelatin comprises a deionized lime-processed gelatin.

* * * * *